US012688222B2

(12) United States Patent
Russell et al.

(10) Patent No.: US 12,688,222 B2
(45) Date of Patent: Jul. 21, 2026

(54) SYSTEM AND METHOD FOR CREATING A CONTROLLABLE OUTPUT SUMMARY FROM TEXT

(71) Applicant: Bank of America Corporation, Charlotte, NC (US)

(72) Inventors: Jennifer Russell, Dallas, TX (US); Emad Noorizadeh, Plano, TX (US); Rajan Jhaveri, Prosper, TX (US)

(73) Assignee: Bank of America Corporation, Charlotte, NC (US)

( * ) Notice: Subject to any disclaimer, the term of this patent is extended or adjusted under 35 U.S.C. 154(b) by 268 days.

(21) Appl. No.: 18/656,697

(22) Filed: May 7, 2024

(65) Prior Publication Data

US 2025/0348527 A1     Nov. 13, 2025

(51) Int. Cl.
    *G06F 16/34*        (2019.01)
    *G06F 40/30*        (2020.01)

(52) U.S. Cl.
    CPC ............ *G06F 16/345* (2019.01); *G06F 40/30* (2020.01)

(58) Field of Classification Search
    CPC ...................................................... G06F 16/345
    See application file for complete search history.

(56) References Cited

U.S. PATENT DOCUMENTS

| | | | |
|---|---|---|---|
| 8,181,021 B2 | 5/2012 | Ginter et al. | |
| 9,098,142 B2 | 8/2015 | Westerman et al. | |
| 10,023,117 B2 | 7/2018 | Ricci | |
| 10,290,320 B2 | 5/2019 | Hu et al. | |
| 10,455,297 B1 * | 10/2019 | Mahyar | H04N 21/4532 |
| 10,685,050 B2 * | 6/2020 | Krishna | G06F 16/345 |
| 10,685,059 B2 * | 6/2020 | Kim | G06F 16/739 |
| 10,885,380 B2 * | 1/2021 | Ko | G06F 18/23 |
| 10,909,313 B2 * | 2/2021 | Can | G06V 10/50 |
| 10,911,840 B2 * | 2/2021 | Goel | G06F 16/43 |
| 10,986,046 B2 * | 4/2021 | Kim | G06F 40/242 |
| 11,029,838 B2 * | 6/2021 | LeMay | G06F 3/0488 |
| 11,409,960 B2 * | 8/2022 | Kong | G06F 40/30 |
| 11,494,658 B2 * | 11/2022 | Chen | G06F 18/214 |
| 11,500,917 B2 * | 11/2022 | Wu | G06F 16/438 |
| 11,983,209 B1 * | 5/2024 | Matei | G06F 16/338 |
| 2017/0185675 A1 * | 6/2017 | Arngren | G10L 19/018 |
| 2019/0266228 A1 * | 8/2019 | Sharma | G06F 40/151 |

(Continued)

OTHER PUBLICATIONS

Chen, Yulong et al., "DialogSum: A real-life scenario dialogue summarization dataset," arXiv preprint arXiv:2105.06762 (2021).

(Continued)

*Primary Examiner* — Reza Nabi

(57)        ABSTRACT

A system for creating a controllable output summary of text is disclosed. The system generates a set of summaries of text and for a first summary from among the set of summaries, executes a script that is configured to append the first summary to a set of summary-title pairs. The system generates a first title associated with the first summary in response to executing the script. The system compares the first title with the text. Based at least on the comparison, the system determines if the title indicates the context of the text. If it is determined that the title indicates the context of the text, the system generates a dataset of title-text pairs including the first title paired with the text. The system trains a target summarization algorithm with the generated dataset.

20 Claims, 3 Drawing Sheets

(56) References Cited

U.S. PATENT DOCUMENTS

| | | | | |
|---|---|---|---|---|
| 2019/0294668 | A1* | 9/2019 | Goel | H04N 21/4788 |
| 2019/0325066 | A1* | 10/2019 | Krishna | G06F 16/345 |
| 2020/0026767 | A1* | 1/2020 | Chen | G06F 16/338 |
| 2020/0251218 | A1* | 8/2020 | Stoval, III | G06N 3/09 |
| 2020/0257757 | A1* | 8/2020 | Chawla | G06F 16/345 |
| 2021/0149933 | A1* | 5/2021 | Chang | G06F 16/35 |
| 2021/0279638 | A1* | 9/2021 | Kano | G06N 20/00 |
| 2021/0365773 | A1* | 11/2021 | Subramanian | G06F 40/166 |
| 2021/0374349 | A1* | 12/2021 | Liu | G06F 40/295 |
| 2022/0050884 | A1* | 2/2022 | Sahu | G06N 5/04 |
| 2022/0254338 | A1* | 8/2022 | Gruber | G06F 3/167 |
| 2022/0269869 | A1* | 8/2022 | Duffy | G06F 40/279 |
| 2022/0399090 | A1* | 12/2022 | Fontecilla | G16H 70/40 |
| 2023/0027310 | A1* | 1/2023 | Muralidharan | G06F 16/345 |
| 2023/0092702 | A1* | 3/2023 | Mao | G06F 40/30 |
| | | | | 704/9 |
| 2023/0315969 | A1* | 10/2023 | Religa | G06F 40/258 |
| | | | | 715/202 |
| 2023/0402065 | A1* | 12/2023 | Gu | G11B 27/34 |
| 2024/0095987 | A1* | 3/2024 | Piramuthu | G06F 40/279 |
| 2024/0257420 | A1* | 8/2024 | Yang | G06F 40/58 |
| 2024/0320430 | A1* | 9/2024 | Fu | G06F 40/284 |
| 2024/0428002 | A1* | 12/2024 | Elangovan | G06F 40/35 |
| 2025/0131380 | A1* | 4/2025 | Cook | G06Q 10/105 |
| 2025/0328934 | A1* | 10/2025 | Doken | G06Q 10/40 |
| 2025/0348527 | A1* | 11/2025 | Russell | G06F 16/345 |

OTHER PUBLICATIONS

Narayan, Shashi, Shay B. Cohen, and Mirella Lapata, "Don't give me the details, just the summary! topic-aware convolutional neural networks for extreme summarization" arXiv preprint arXiv:1808. 08745 (2018).

Wang, Zirui, et al., "Towards zero-label language learning," arXiv preprint arXiv:2109.09193 (2021).

* cited by examiner

SYSTEM AND METHOD FOR CREATING A CONTROLLABLE OUTPUT SUMMARY FROM TEXT

TECHNICAL FIELD

The present disclosure relates generally to text processing and generation, and more specifically to a system and method for creating a controllable output summary from text.

BACKGROUND

Users use summarization algorithms to generate summaries from text. The summarization algorithms are trained with a specific summarization style and lack controllability and adaptability in terms of summarization styles.

SUMMARY

The system described in the present disclosure is particularly integrated into practical applications of improving the text summarization techniques and the functioning of computer systems that are tasked with generating summaries from text. This approach provides technical advantages and improvements such as reduced computing and network resources for text summarization processes.

In current scenarios, text summarization algorithms face a few challenges that limit their effectiveness and practicality in real-world applications. For example, the text summarization algorithms are typically trained and modeled to generate a specific style of summarization with limited adaptability to the output summarization styles. For instance, the text summarization algorithms may conform to specific predefined requirements such as length, format, or sentence structure to generate summaries. This, in turn, leads to the output summaries by the current text algorithms lacking controllability in terms of summarization style and other features of a summary.

In another example, the text summarization algorithms have a large number of parameters (e.g., weights and bias values of neural networks) which require a large volume of computational resources to process and compute in the text summary generation process. In another example, the current training methods of summarization algorithms rely on a comprehensive and labeled training dataset with a predefined summarization style. The creation of such training datasets requires a large volume of computational resources. Furthermore, maintenance and storage of such training datasets require a large amount of storage capacity. Moreover, comprehensive and labeled training datasets are already configured to help a summarization algorithm generate a summary with a predefined summarization style which may not be the user's required/desired style.

The disclosed system provides a technical solution to these and other technical problems. In some embodiments, the disclosed system adds controllability and adaptability features to the output summaries. For example, the disclosed system allows customization to the summarization style, length, sentence structure, and format, among other features. To this end, the disclosed system may leverage samples of a desired summarization style to train the summarization algorithm to generate summaries with the desired summarization style. In this manner, the disclosed system obviates the need for large and comprehensive training datasets with the desired summarization style, and instead, the disclosed system utilizes a small sample of summaries to train the text summarization algorithm according to the desired summarization style. This leads to the amount of processing and memory resources to generate summaries with the desired summarization style to be reduced.

In some embodiments, the disclosed system may leverage and transfer the intelligence and insight derived from a large-parameter text summarization algorithm to train a smaller text summarization algorithm (e.g., a text summarization algorithm with a smaller number of parameters). This, in turn, leads to reducing the processing and memory resources in the text summarization process. In this way, the level of accuracy and quality of the summarization process by the larger text summarization algorithm is retained by the smaller text summarization algorithm as well as processing and memory resources for the text summarization process are reduced because the smaller text summarization algorithm requires fewer processing and memory resources than the larger text summarization algorithm.

In this manner, the disclosed system improves the text summarization techniques and the functioning of computer systems tasked with generating summaries from text. In some embodiments, a system for creating a controllable output summary of text comprises a memory operably coupled to a processor. The memory is configured to store a file comprising a first text, wherein the first text comprises one or more lines of text. The processor is configured to generate a first set of summaries of the first text, wherein each summary from the first set of summaries is associated with a respective style of summarization. The processor is further configured to execute a script that is configured to append the first summary to a set of summary-title pairs for a first summary from the first set of summaries. The processor is further configured to generate a first title associated with the first summary in response to executing the script. The processor is further configured to compare the first title with the first text, wherein comparing the first title with the first text comprises generating a first feature vector for the first title, wherein the first feature vector indicates the position of the first title in a vector space and the first feature vector represents a first set of features of the first title, comprising context of the first title, generating a second feature vector for the first text, wherein the second feature vector indicates a position of the first text in the vector space and the second feature vector represents a second set of features of the first text, comprising context of the first text, and comparing the first feature vector with the second feature vector. The processor is further configured to determine that the first title indicates the context of the first text based at least in part upon the comparison. The processor is further configured to generate a dataset of title-text pairs, wherein the generated dataset of title-text pairs comprises the first title paired with the first text. The processor is further configured to train a target summarization algorithm with the generated dataset.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
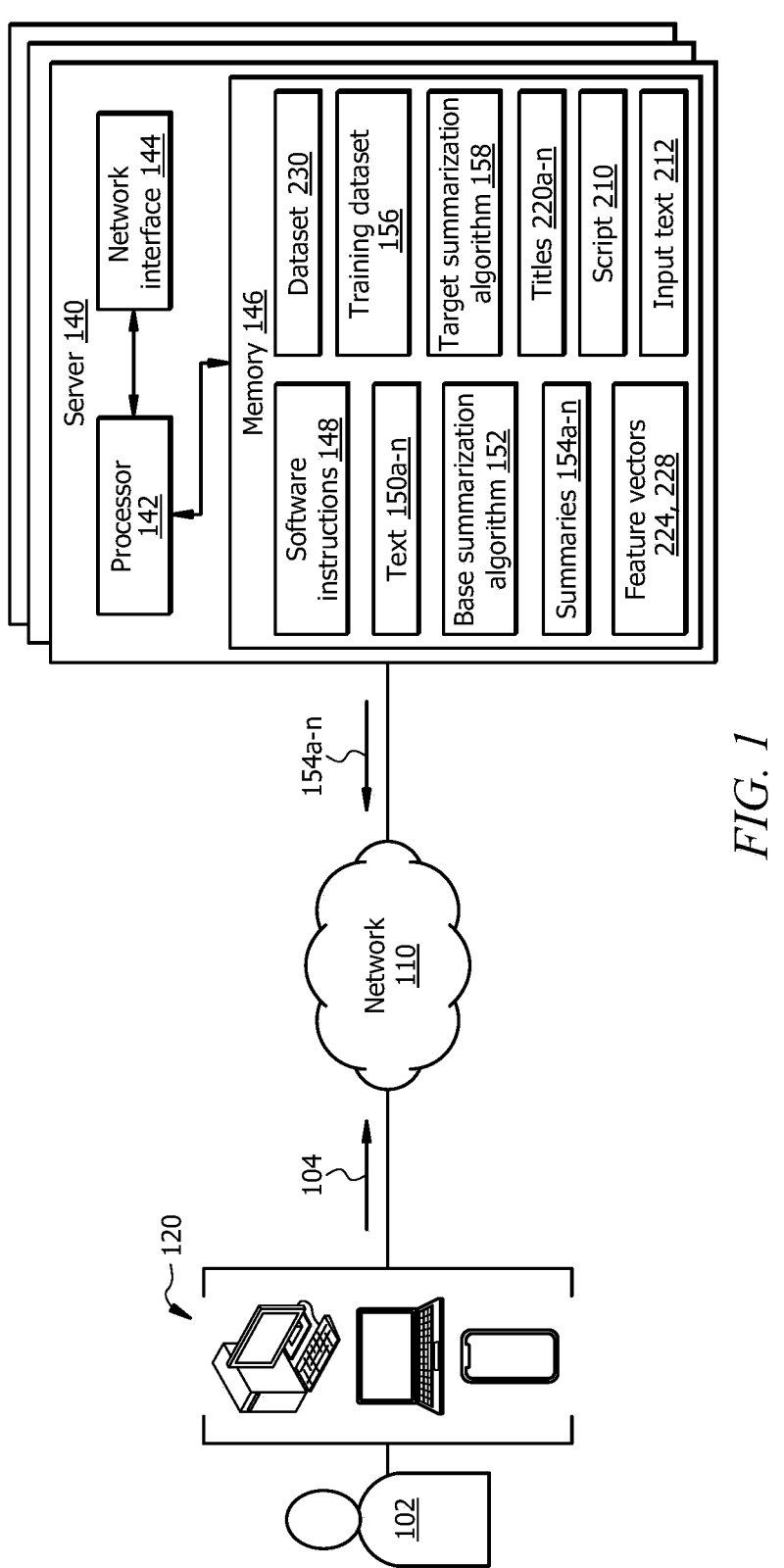
FIG. 1 illustrates an embodiment of a system configured to create a controllable output summary of text.
Figure 2:
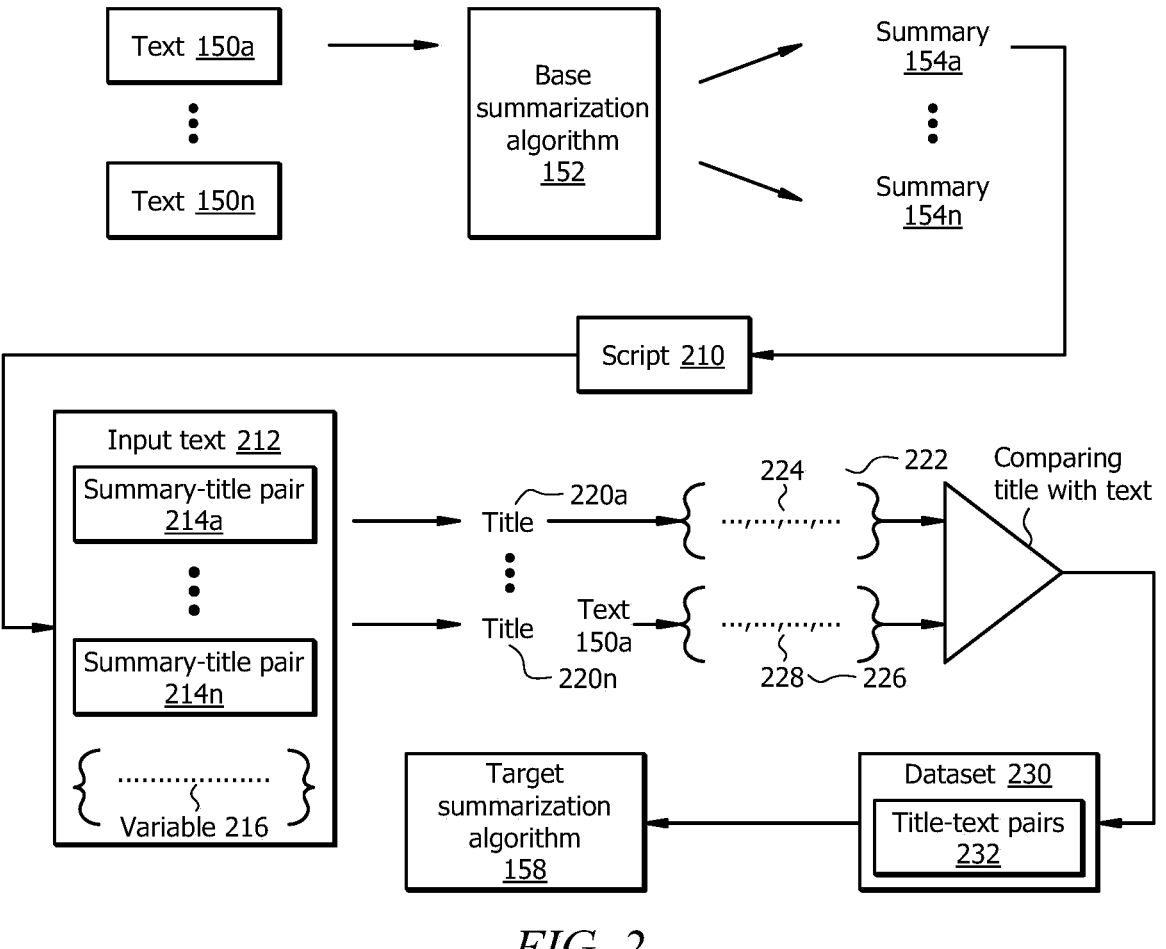
FIG. 2 illustrates an example operational flow of the system of FIG. 1.
Figure 3:
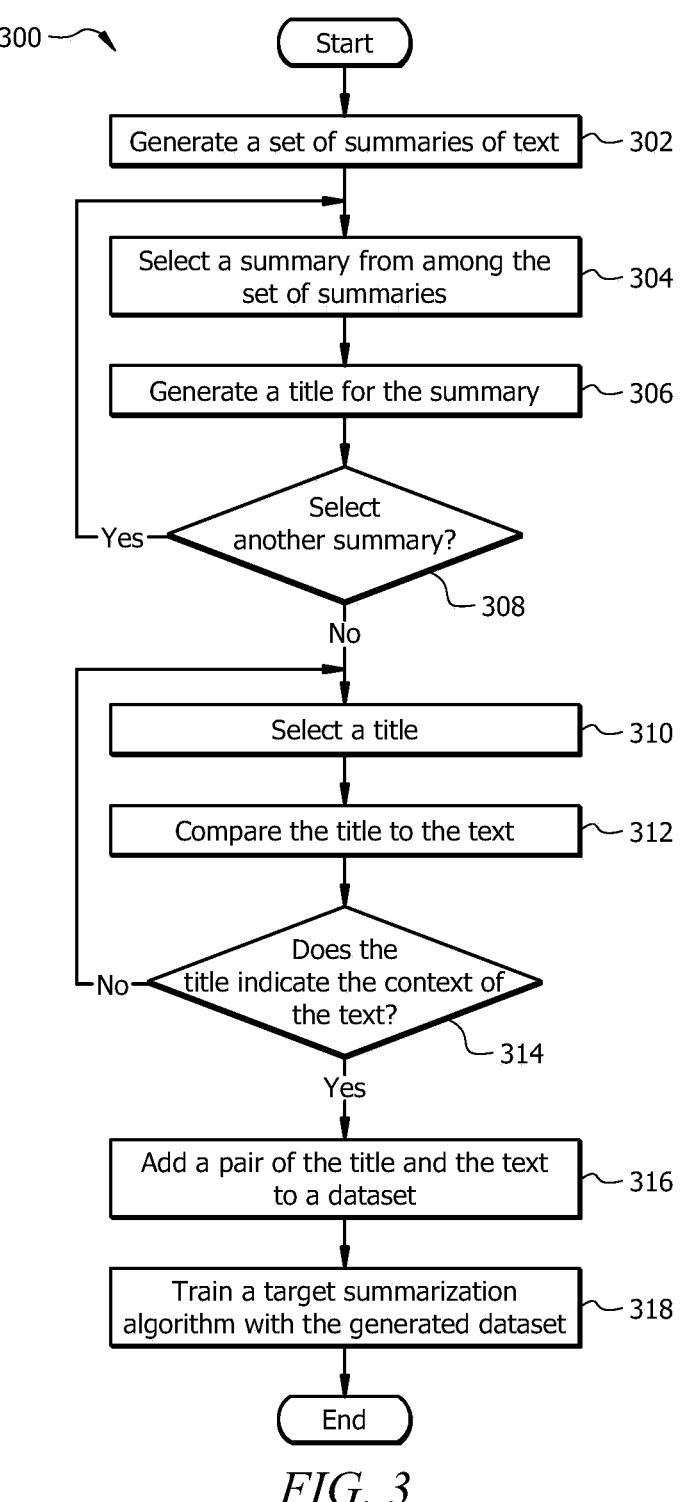
FIG. 3 illustrates an example flowchart of a method to create a controllable output summary of text.

As described above, previous technologies fail to provide efficient and reliable solutions to create a controllable output summary of text. Embodiments of the present disclosure and its advantages may be understood by referring to FIGS. 1 through 3. FIGS. 1 through 3 are used to describe systems and methods to create a controllable output summary of text, according to some embodiments.

System Overview

FIG. 1 illustrates an embodiment of a system 100 that is generally configured to improve the text summarization process. In some embodiments, the system 100 comprises a server 140 communicatively coupled to one or more computing devices 120 via a network 110. Network 110 enables the communication among the components of the system 100. A user 102 may use the computing device 120 to send a request 104 to generate a summary of text to the server 140, or the request 104 may be for generating a plurality of summaries for a plurality of text. The server 140 may receive the request 104 and perform certain operations (described herein) to generate the requested summary/summaries. In other embodiments, system 100 may not have all of the components listed and/or may have other elements instead of, or in addition to, those listed above.

In general, the system 100 improves the text summarization techniques and the functioning of computer systems that are tasked with generating summaries from text. In current scenarios, text summarization algorithms face a few challenges that limit their effectiveness and practicality in real-world applications. For example, the text summarization algorithms are typically trained and modeled to generate a specific style of summarization with limited adaptability to the output summarization styles. For instance, the text summarization algorithms may conform to specific pre-defined requirements such as length, format, or sentence structure to generate summaries. This, in turn, leads to the output summaries by the current text algorithms lacking controllability in terms of summarization style and other features of a summary.

In another example, the text summarization algorithms have a large number of parameters (e.g., weights and bias values of neural networks) which require a large volume of computational resources to process and compute in the text summary generation process. In another example, the current training methods of summarization algorithms rely on a comprehensive and labeled training dataset with a predefined summarization style. The creation of such training datasets requires a large volume of computational resources. Furthermore, maintenance and storage of such training datasets require a large amount of storage capacity. Moreover, comprehensive and labeled training datasets are already configured to help a summarization algorithm generate a summary with a predefined summarization style which may not be the user's required/desired style.

The disclosed system 100 provides a technical solution to these and other technical problems. In some embodiments, the system 100 adds controllability and adaptability features to the output summaries. For example, the system 100 allows customization to the summarization style, length, sentence structure, and format, among other features. To this end, the system 100 may leverage samples of a desired summarization style to train the summarization algorithm to generate summaries with the desired summarization style. In this manner, the system 100 obviates the need for large and comprehensive training datasets with the desired summarization style, and instead, the system 100 utilizes a small sample of summaries to train the text summarization algorithm according to the desired summarization style. This leads to reduction of the amount of processing and memory resources needed to generate summaries with the desired summarization style.

In some embodiments, the system 100 may leverage and transfer the intelligence and insight derived from a large-parameter text summarization algorithm to train a smaller text summarization algorithm (e.g., a text summarization algorithm with a smaller number of parameters). This, in turn, leads to reducing the processing and memory resources in the text summarization process. In this way, the level of accuracy and quality of the summarization process by the larger text summarization algorithm is retained by the smaller text summarization algorithm, and processing and memory resources for the text summarization process are reduced because the smaller text summarization algorithm requires fewer processing and memory resources than the larger text summarization algorithm.

In this manner, the system 100 improves the text summarization techniques and the functioning of computer systems tasked with generating summaries from text.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Example Computing Device

Computing device 120 may be generally any device that is configured to process data and interact with users 102. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by user 102. The computing device 120 may include a hardware processor, memory, and/or circuitry configured to perform any of the functions or actions of the computing device 120 described herein. For example, the computing device 120 includes a processor in signal communication with a network interface and a memory. The memory of the computing device 120 stores software instructions that when executed by the processor of the computing device 120 cause the processor of the computing device 120 to perform one or more operations of the computing device 120 described herein. For example, a software application designed using software code may be stored in the memory of the computing device 120 and executed by the processor of the computing device 120 to perform the functions of the computing device 120. The computing device 120 is configured to communicate with other devices and components of the system 100 via the network 110.

The computing device 120 may be configured to perform any action described herein. For example, assume that the user 102 wants to generate one or more summaries 154 of one or more pieces of text 150. The user 102 may use computing device 120 to send a request 104 that indicates to generate the one or more summaries 154 from the one or more pieces of text 150 to the server 140. In response, the server 140 may perform a series of operations to generate the one or more summaries 154. This process is described in great detail in FIG. 2.

Server

Server 140 may include one or more hardware computer systems, such as virtual machines. For example, the server 140 may be implemented by a plurality of computing devices using distributed computing and/or cloud computing systems in a network. In some embodiments, the server 140 may be a server in a server farm. The server 140 may be an instance of one or more servers 140. In certain embodiments, the server 140 may be configured to provide services and resources (e.g., data and/or hardware resources) to the components of the system 100. For example, the server 140 may generate summaries 154 and titles 220 for text 150.

The server 140 comprises a processor 142 operably coupled with a network interface 144 and a memory 146. Processor 142 comprises one or more processors operably coupled to the memory 146. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and stores the results of ALU operations. The processor 142 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 148) to perform the operations of the server 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of the operational flow 200 described in FIG. 2, and one or more operations of the method 300 as described in FIG. 3.

Network interface 144 is configured to enable wired and/or wireless communications. The network interface 144 may be configured to communicate data between the server 140 and other devices, systems, or domains of the system 100. For example, the network interface 144 may comprise a near field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 142. For example, the memory 146 may store software instructions 148, text 150a-n, base summarization algorithm 152, summaries 154a-n, feature vectors 224-228, dataset 230, training dataset 156, target summarization algorithm 158, titles 220a-n, script 210, input text 212, and/or any other data or instructions. The software instructions 148 may comprise any suitable set of instructions, logic, rules, or code operable to execute the processor 142 and perform the functions described herein, such as some or all of those described in FIGS. 1-3. The text 150 may be or include any type of text. For example, the text 150 may include emails, articles, video/audio transcriptions, a transcription of a phone conversation, and the like. The text 150 may include one or more lines of text. The text 150 may include sentences.

The base summarization algorithm 152 may be implemented by the processor 142 executing the software instructions 148 and is generally configured to generate a summary 154 from a piece of text 150. The base summarization algorithm 152 may comprise support vector machine, neural network, random forest, k-means clustering, etc. The base summarization algorithm 152 may be implemented by a plurality of neural network (NN) layers, convolutional NN (CNN) layers, Long-Short-Term-Memory (LSTM) layers, Bi-directional LSTM layers, recurrent NN (RNN) layers, and the like. In some examples, the base summarization algorithm 152 may be implemented by natural language processing (NLP), data processing, text recognition, generative text processing, etc. In certain embodiments, the base summarization algorithm 152 may perform word segmentation, sentence segmentation, word tokenization, sentence tokenization, and sentiment analysis on a given text 150. The base summarization algorithm 152 may be implemented by unsupervised, semi-supervised, supervised learning. In some embodiments, the base summarization algorithm 152 may have a large number of parameters to be trained on. The number of parameters may be indicative of and proportional to the complexity of the algorithm. Such parameters may include weights and biases in neural networks of the base summarization algorithm 152. These parameters are adjusted during the training phase to reduce errors in the summarization-generating processor and to increase the accuracy of the generated summaries.

The base summarization algorithm 152 may be pre-trained by a training dataset 156. The training dataset 156 may include a set of pieces of text 150, where each piece of text 150 is labeled with a respective summary 154. In the training stage, the base summarization algorithm 152 may be given a portion of the training dataset 156 and asked to learn the association and relationship between each pair of text 150 and its corresponding summary 154. In response, with respect to a first text 150 and a first summary 154, the base summarization algorithm 152 may extract a first set of features from the first text 150 and generate a first feature vector from the first set features for the first text 150. The first set of features may indicate context, sentiment, tokenized words, tokenized sentences, a frequency of each word, and other linguistic characteristics of the first text 150. The base summarization algorithm 152 may perform a similar operation on the first summary 154 and extract a second set of features from the first summary 154 and generate a second feature vector from the second set of features for the first summary 154. The second set of features may indicate key themes, context, content, sentiment, meaning, tokenized words, tokenized sentence(s), a frequency of each word, and other linguistic characteristics of the first summary 154. The base summarization algorithm 152 may learn the associations between the first set of features and the second set of features and use this learning to generate summaries 154 for other text 150.

In the testing stage, the base summarization algorithm 152 is presented with a new text 150 that is not labeled with a summary. The objective is to evaluate the algorithm's ability to apply its learned associations and relationships to generate an accurate summary 154 for the new text 150. During the testing process, the base summarization algorithm 152 extracts a first set of features from the new text 150, where the features indicate content, context, word frequency, sentence structure, tokenized words, and tokenized sentences, among other linguistics characteristics. The base summarization algorithm 152 may determine the main topic of the text 150 based on the extracted features and the learned associations between text and summary from the training dataset 156. The base summarization algorithm 152 may determine a sequence of words (or beam) to generate the summary 154 for the new text 150 based on the determined main topic of the text 150. The base summarization algorithm 152 may be fine-tuned in back-propagations where weights and biases of the neural network of the base summarization algorithm 152 are revised based on predetermined objectives to increase the accuracy of the generated summary 154. The base summarization algorithm 152 may perform similar operations for any given text 150 to generate a summary 154 of the text 150. In some embodiments, a summary 154 may be one or more lines of text.

In some embodiments, the base summarization algorithm 152 may be configured to generate summaries 154 with different summarization styles. For example, in a summarization style, the main topic is extracted from the text 150, and side topics of the text 150 may be ignored. In the same or another example, in a summarization style, a sentiment of the text 150 may be extracted and included in the summary 154. In the same or another example, a summarization style may include exact phrases, sentences, and/or words from the text 150. In the same or another example, a summarization style may include a narrative style. These examples are not meant to limit the scope of the present disclosure and other examples are possible and have been contemplated by the present disclosure.

The target summarization algorithm 158 may be implemented by the processor 142 executing the software instructions 148 and is generally configured to generate a title (e.g., a short summary) for a piece of text (e.g., text 150 or summary 154). The target summarization algorithm 158 may comprise a support vector machine, neural network, random forest, k-means clustering, etc. The target summarization algorithm 158 may be implemented by a plurality of neural network layers, CNN layers, LSTM layers, Bi-directional LSTM layers, RNN layers, and the like. In some examples, the target summarization algorithm 158 may be implemented by NLP, data processing, text recognition, generative text processing, etc. In certain embodiments, the target summarization algorithm 158 may perform word segmentation, sentence segmentation, word tokenization, sentence tokenization, and sentiment analysis on a given text (e.g., text 150 or summary 154). The target summarization algorithm 158 may be implemented by unsupervised, semi-supervised, and/or supervised learning.

In some embodiments, the target summarization algorithm 158 may have a smaller number of parameters (e.g., weights and biases) compared to the base summarization algorithm 152. Thus, the learned summarization process from the base summarization algorithm 152 may be transferred to the target summarization algorithm 158 to: 1) leverage the learned summarization process in the lighter and less resource-intensive summarization algorithm 158, and 2) increase the speed and efficiency in the summarization process, particularly in environments where computational resources are limited or where responsiveness is important. The target summarization algorithm 158, with a smaller parameter count, is configured to operate with less computational power and memory. This makes the target summarization algorithm 158 suitable for deployment in scenarios where the availability of computational resources is a constraint.

In some embodiments, transferring the insight and knowledge in the summarization process from the base summarization algorithm 152 to the target summarization algorithm 158 leads to retaining the accuracy, quality, and sophistication in generating summaries even though the target summarization algorithm 158 operates on a smaller scale with the smaller number of parameters than the base summarization algorithm 152.

In some embodiments, the target summarization algorithm 158 may provide controllability and adaptability in the summary generation process. For example, the smaller size of the target summarization algorithm 158 may allow for quicker retraining or fine-tuning when adapting to a new style of summarization requirement. The process of generating a summary from the text by the target summarization algorithm 158 is described in greater detail in FIG. 2. The script 210 may be implemented by the processor 142 executing the software instructions 148 and is generally configured to automate the process of generating titles for summaries 154.

Operational Flow for Creating Controllable Output Summary from Text

FIG. 2 illustrates an example operational flow 200 of system 100 (see FIG. 1) for creating a controllable output summary from text 150. In operation, the operational flow 200 may begin when the user sends a request (e.g., request 104 of FIG. 1) to the server 140 to summarize one or more pieces of text 150. In response, the server 140 may feed the text 150a-n to the base summarization algorithm 152. The server 140 may perform the following operations for each piece of text 150a-n. For example, with respect to a first text 150a from among the pieces of text 150a-n, the target summarization algorithm 158 may generate a set of summaries 154a-n.

In some embodiments, in this process, the base summarization algorithm 152 may be requested to generate a particular number of summaries 154a-n, such as three, five, ten, twenty, etc., where each summary 154a-n is different from other summaries 154a-n. For example, the base summarization algorithm 152 may determine a different sequence of words to generate each summary 154a-n in order to have different versions of summaries 154a-n. In some embodiments, each summary 154a-n may be associated with a respective style of summarization, similar to that described in FIG. 1. Some examples of styles of summarization may include short summaries, bullet-point summaries, narrative-style summaries (e.g., story-like summaries), among other styles. In some embodiments, a summary 154a-n may be generated to include a particular sequence of words that convey the main topic of the text 150a.

Customizing an Input Text for Training the Summarization Algorithm and Generating a Title for Text In response to generating the summaries 154a-n from the text 150a, the server 140 may customize the input text 212 based on each summary 154a-n, one summary 154a-n at a time. The input text 212 may include a set of summary-title pairs 214a-n and a variable 216 to be replaced with a summary 1541a-n, one at a time. In some cases, a summary-title pair 214a-n may include a summary of text 150 and a corresponding title. In some cases, a summary-title pair 214a-n may include a text 150 and the corresponding title. In some embodiments, the title may be a short summary of the given text 150 (e.g., the title may be less than a threshold number of words, such as five, or ten words). In some embodiments, the summary 154a-n may be a longer summary than a title of a given text 150, for example, more than the threshold number of words, comprising two or more lines.

In some embodiments, a title for the summary in the title-summary pair 214a-n may be generated by the base summarization algorithm 152. In some embodiments, the title for the summary in the title-summary pair 214a-n may be generated manually. The input text 212 may be used as a sample training dataset to train the base summarization algorithm 152 to generate a short summary (or a title) for each summary 154a-n. The use of the summary-title pairs 214a-n provides control and adaptability over the style of title generation. By analyzing the summary-title pairs 214a-n, the base summarization algorithm 152 may identify and learn the patterns and title generation styles of the summary-title pairs 214a-n and use it to generate a title for a summary according to the detected style. Thus, the summarization style may be adapted and controlled by the summary-title pairs 214a-n. To this end, the server 140 may execute the script 210 which is configured to append each summary 154a-n to the set of summary-title pairs 214a-n, one at a time.

The server 140 provides the summaries 154a-n (one summary 154a-n at a time) and the input text 212 as input to the script 210. The script 210 runs through the summaries 154a-n and dynamically replaces the variable 216 with a summary 154. For example, the server 140 may execute the script 210 to generate a first input text 212 that includes the summary-title pairs 214a-n and the first summary 154a, with an indication to generate a title for the first summary 154a. In this process, the script 210 generates a first input text 212 in which the variable 216 is replaced with the summary 154a.

The server 140 may feed the first input text 212 to the base summarization algorithm 152 to generate a first title 220a for the first summary 154a. In this process, the base summarization algorithm 152 may extract features from each summary-title pair 214a-n, generate a feature vector for each summary-title pair 214a-n, extract features from the summary 154a, generate a feature vector for the summary 154, and use the features and similarity between the feature vectors to predict the title 220a for the summary 154a based on the pattern and relationship between each summary and title in each summary-title pair 214a-n.

Similar operations may be performed for other summaries 154a-n. For example, for the summary 154n, the server 140 may execute the script 210 to generate the $n^{th}$ input text 212a that includes the summary-title pairs 214a-n and the first summary 154n, with an indication to generate a title for the summary 154n. In this process, the script 210 may generate the $n^{th}$ input text 212 in which the variable 216 is replaced with the summary 154n. The server 140 may feed the $n^{th}$ input text 212 to the base summarization algorithm 152 to generate the title 220n for the summary 154n. In this manner, the server 140 may generate a set of titles 220a-b for the summaries 154a-n, respectively.

Validating the Title

Now that the titles 220a-n are generated, the server 140 may proceed to validate the accuracy of each title 220a-n. The server 140 may evaluate the titles 22a-n by implementing the base summarization algorithm 152 and/or the target summarization algorithm 158. In this process, the server 140 (e.g., via the base summarization algorithm 152 and/or the target summarization algorithm 158) may compare each title 220a-b with the initial text 150a. For example, with respect to the first title 220a, the server 140 may compare the first title 220a with the text 150a. To this end, the server 140 may extract a first set of features 222 from the first title 220a, where the features 222 may indicate content, context, word frequency, tokenized words, tokenized sentences, sentiment, word meaning, and other linguistic features of the title 220a.

The server 140 may generate a first feature vector 224 for the first title 220a, where the first feature vector 224 includes numerical values representing the features 222. The first feature vector 224 may represent a position of the title 220a in a vector space. The server 140 may perform a similar operation for the text 150a. For example, the server 140 may extract a second set of features 226 from the text 150a, where the features 226 may indicate content, context, word frequency, tokenized words, tokenized sentences, sentiment, word meaning, and other linguistic features of the text 150a. The server 140 may generate a second feature vector 228 for the text 150a, where the second feature vector 228 includes numerical values representing the features 226.

The server 140 may compare the first feature vector 224 with the second feature vector 228 to determine the similarity between the feature vectors 224 and 228, e.g., the similarity in context between the text 150*a* and the title 220*a*. In this process, in some embodiments, the server 140 may determine a cosine similarity between the feature vectors 224 and 228 in the vector space. In some embodiments, the server 140 may determine an Euclidean distance between the feature vectors 224 and 228 in the vector space. If it is determined that a distance (e.g., Euclidean distance) between the feature vectors 224 and 228 is less than a threshold distance (e.g., less than 0.1 centimeter (cm), 0.01 cm, etc.), the server 140 may determine that the title 220*a* indicates the context of the text 150*a* based on the comparison between the vectors 224 and 228.

In some embodiments, determining that the title 220*a* indicates the context of the text 150*a* includes comparing each numerical value of the feature vector 224 with the counterpart numerical value of the feature vector 228 and determining whether more than a threshold number (e.g., more than 80%, 85%, etc.) of numerical values of the feature vector 224 correspond to the counterpart numerical values of the feature vector 228. If it is determined that more than the threshold number of numerical values of the feature vector 224 correspond to the counterpart numerical values of the feature vector 228, the server 140 may determine that the title 220*a* indicates the context of the text 150*a*.

In some embodiments, determining that the title 220*a* indicates the context of the text 150*a* includes comparing each numerical value of the feature vector 224 with the counterpart numerical value of the feature vector 228 and determining whether the more than a threshold number (e.g., more than 80%, 85%, etc.) of numerical values of the feature vector 224 are within a threshold range (e.g., ±2%, ±5%, etc.) of the counterpart numerical values of the feature vector 228. If it is determined that more than the threshold number of numerical values of the feature vector 224 are within a threshold range of the counterpart numerical values of the feature vector 228, the server 140 may determine that the title 220*a* indicates the context of the text 150*a*. In other words, the server 140 may determine that the title 220*a* is a suitable title for the text 150*a*.

The server 140 may perform similar operations for other titles 220*a-n*. For example, with respect to the title 220*n*, the server 140 may generate a feature vector 224 from the title 220*n*, generate a feature vector 228 from the text 150*a*, compare the feature vectors 224 and 228, and based on the comparison, determine the similarity between the vectors to determine whether the title 220*n* indicates the context of the text 150*a*. In this manner, the server 140 may validate each title 220*a-n* with respect to the text 150*a*.

The server 140 may generate a dataset 230 of title-text pairs 232, where the title-text pairs 232 may include the pair of title 220*a* and text 150*a* in response to determining that the title 220*a* indicates the context of the text 150*a*, and other titles may be removed from consideration to be included in the dataset 230. For example, with respect to a second title 220, the server 140 may generate a feature vector 224 for the second title 220, compare the feature vector 224 with the feature vector 228 of the text 150*a*, and if the server 140 determines that the second title 220 does not indicate the context of the text 150*a* based on the comparison between the feature vectors 224 and 228, the server 140 may remove the second title 220 from consideration to be included in the dataset 230. The server 140 may populate the dataset 230 with other title-text pairs 232 in response to determining that a title indicates the context of a respective text. The server 140 may use the generated dataset 230 to train the target summarization algorithm 158 to be able to generate accurate, concise, and relevant titles 220 for text 150*a-n* or other text.

In operation of the target summarization algorithm 158, assume that the server 140 receives a text 150 and a request 104 to generate a short summary (e.g., a title 220) for the text 150. In response, the server 140 may input the received text 150 to the target summarization algorithm 158. The target summarization algorithm 158 may use the dataset 230 as a training dataset to generate and predict a title 220 for the text 150 that provides the context of the text 150.

Example Method for Generating Controllable Output Summary for Text

FIG. 3 illustrates an example flowchart of a method 300 for generating a controllable output summary for text 150, according to some embodiments. Modifications, additions, or omissions may be made to method 300. Method 300 may include more, fewer, or other operations. For example, operations may be performed in parallel or in any suitable order. While at times it is discussed that the system 100, computing devices 120, server 140, or components of any of thereof perform some operations, any suitable system or components of the system may perform one or more operations of the method 300. For example, one or more operations of method 300 may be implemented, at least in part, in the form of software instructions 148 of FIG. 1, stored on a tangible non-transitory machine-readable medium (e.g., memory 146 of FIG. 1) that when run by one or more processors (e.g., processor 142 of FIG. 1) may cause the one or more processors to perform operations 302-318.

At operation 302, the server 140 generates a set of summaries 154*a-n* of text 150*a*. For example, the server 140 may implement the base summarization algorithm 152 to generate the summaries 154*a-n*, similar to that described in FIG. 2. At operation 304, the server 140 selects a summary 154*a-n* from among the set of summaries 154*a-n*. The server 140 may iteratively select a summary until no summary 154*a-n* is left for evaluation.

At operation 306, the server 140 generates a title 220*a* for the summary 154*a*. For example, the server 140 may utilize the script 210 and the base summarization algorithm 152 to generate the title 220*a*, similar to that described in FIG. 2.

At operation 308, the server 140 determines whether to select another summary 154*a-n*. The server 140 may select another summary 154*a-n* if at least one summary 154*a-n* is left for evaluation. If it is determined to select another summary 154*a-n*, the method 300 returns to operation 304. Otherwise, the method 300 proceeds to operation 310. In this manner, the server 140 may generate the titles 220*a-n*.

At operation 310, the server 140 selects a title 220*a-n*. The server 140 may iteratively select a title 220*a-n* until no title is left for evaluation. At operation 312, server 140 compares the title 220 to the text 150*a*. For example, the server 140 may compare each of the titles 220*a-n* with the text 150*a* individually.

At operation 314, the server 140 determines whether the title 220 indicates the context of the text 150*a*. For example, the server 140 may implement feature extraction, feature vector generation and comparison for the title 220 and the text 150*a*, similar to that described in FIG. 2. If it is determined that the title 220 indicates the context of the text 150*a*, the method 300 proceeds to operation 316. Otherwise, the method 300 returns to operation 310 to evaluate another title 220.

At operation 316, the server 140 generates a dataset 230 and adds a pair of title 220 and the text 150*a* to the dataset 230. At operation 318, the server 140 trains a target summarization algorithm 158 with the generated dataset 230.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for creating a controllable output summary of text, comprising:
a memory configured to store a file comprising a first text, wherein the first text comprises one or more lines of text; and
a processor, operably coupled to the memory and configured to:
generate a first set of summaries of the first text, wherein each summary from the first set of summaries is associated with a respective style of summarization;
for a first summary from the first set of summaries, execute a script that is configured to append the first summary to a set of summary-title pairs;
generate a first title associated with the first summary in response to executing the script;
compare the first title with the first text, wherein comparing the first title with the first text comprises:
generating a first feature vector for the first title, wherein:
the first feature vector indicates a position of the first title in a vector space; and
the first feature vector represents a first set of features of the first title, comprising context of the first title;
generating a second feature vector for the first text, wherein:
the second feature vector indicates a position of the first text in the vector space; and
the second feature vector represents a second set of features of the first text, comprising context of the first text;
comparing the first feature vector with the second feature vector;
based at least in part upon the comparison, determine that the first title indicates context of the first text;

generate a dataset of title-text pairs, wherein the generated dataset of title-text pairs comprises the first title paired with the first text; and
train a target summarization algorithm with the generated dataset.

2. The system of claim 1, wherein the processor is further configured to:
receive a second text;
input the received second text to the target summarization algorithm; and
predict a second title for the second text, wherein the second title indicates context of the second text.

3. The system of claim 1, wherein determining that the first title indicates context of the first text comprises:
comparing each numerical value of the first feature vector with a counterpart numerical value of the second feature vector; and
determining that more than a threshold number of numerical values of the first feature vector correspond to counterpart numerical values of the second feature vector.

4. The system of claim 1, wherein determining that the first title indicates context of the first text comprises:
comparing each numerical value of the first feature vector with a counterpart numerical value of the second feature vector; and
determining that more than a threshold number of numerical values of the first feature vector are within a threshold range of counterpart numerical values of the second feature vector.

5. The system of claim 1, wherein the respective style of summarization comprises:
a first style in which a main topic is extracted from the first text and side topics of the first text are ignored; or
a second style in which a sentiment of the first text extracted and included in a summary.

6. The system of claim 1, wherein the processor is further configured to:
for a second summary from the first set of summaries, execute the script to append the second summary to the set of summary-title pairs;
generate a second title associated with the second summary in response to executing the script;
compare the second title with the first text, wherein comparing the second title with the first text comprises:
generating a third feature vector for the second title, wherein:
the third feature vector indicates a position of the second title in a vector space; and
the third feature vector represents a third set of features of the second title, comprising context of the second title; and
comparing the first feature vector with the third feature vector;
based at least in part upon the comparison, determine that the second title does not indicate the context of the first text; and
in response to determining that the second title does not indicate the context of the first text, remove the second title from consideration to be included in the dataset.

7. The system of claim 1, wherein the first text comprises at least one of an email, an article, or a transcription of a phone conversation.

8. A method for creating a controllable output summary of text, comprising:
storing a file comprising a first text, wherein the first text comprises one or more lines of text; and generating a first set of summaries of the first text, wherein each summary from the first set of summaries is associated with a respective style of summarization;

for a first summary from the first set of summaries, executing a script that is configured to append the first summary to a set of summary-title pairs;

generating a first title associated with the first summary in response to executing the script;

comparing the first title with the first text, wherein comparing the first title with the first text comprises:

generating a first feature vector for the first title, wherein:

the first feature vector indicates a position of the first title in a vector space; and the first feature vector represents a first set of features of the first title, comprising context of the first title;

generating a second feature vector for the first text, wherein:

the second feature vector indicates a position of the first text in the vector space; and the second feature vector represents a second set of features of the first text, comprising context of the first text;

comparing the first feature vector with the second feature vector;

based at least in part upon the comparison, determining that the first title indicates context of the first text;

generating a dataset of title-text pairs, wherein the generated dataset of title-text pairs comprises the first title paired with the first text; and training a target summarization algorithm with the generated dataset.

9. The method of claim 8, further comprising:

receiving a second text;

inputting the received second text to the target summarization algorithm; and predicting a second title for the second text, wherein the second title indicates context of the second text.

10. The method of claim 8, wherein determining that the first title indicates context of the first text comprises:

comparing each numerical value of the first feature vector with a counterpart numerical value of the second feature vector; and determining that more than a threshold number of numerical values of the first feature vector correspond to counterpart numerical values of the second feature vector.

11. The method of claim 8, wherein determining that the first title indicates context of the first text comprises:

comparing each numerical value of the first feature vector with a counterpart numerical value of the second feature vector; and determining that more than a threshold number of numerical values of the first feature vector are within a threshold range of counterpart numerical values of the second feature vector.

12. The method of claim 8, wherein the respective style of summarization comprises:

a first style in which a main topic is extracted from the first text and side topics of the first text are ignored; or a second style in which a sentiment of the first text extracted and included in a summary.

13. The method of claim 8, further comprising:

for a second summary from the first set of summaries, executing the script to append the second summary to the set of summary-title pairs;

generating a second title associated with the second summary in response to executing the script;

comparing the second title with the first text, wherein comparing the second title with the first text comprises:

generating a third feature vector for the second title, wherein:

the third feature vector indicates a position of the second title in a vector space; and the third feature vector represents a third set of features of the second title, comprising context of the second title; and comparing the first feature vector with the third feature vector;

based at least in part upon the comparison, determining that the second title does not indicate the context of the first text; and in response to determining that the second title does not indicate the context of the first text, removing the second title from consideration to be included in the dataset.

14. The method of claim 8, wherein the first text comprises at least one of an email, an article, or a transcription of a phone conversation.

15. A non-transitory computer-readable medium storing instructions that, when executed by a processor, cause the processor to:

store a file comprising a first text, wherein the first text comprises one or more lines of text;

generate a first set of summaries of the first text, wherein each summary from the first set of summaries is associated with a respective style of summarization;

for a first summary from the first set of summaries, execute a script that is configured to append the first summary to a set of summary-title pairs;

generate a first title associated with the first summary in response to executing the script;

compare the first title with the first text, wherein comparing the first title with the first text comprises:

generating a first feature vector for the first title, wherein:

the first feature vector indicates a position of the first title in a vector space; and the first feature vector represents a first set of features of the first title, comprising context of the first title;

generating a second feature vector for the first text, wherein:

the second feature vector indicates a position of the first text in the vector space; and the second feature vector represents a second set of features of the first text, comprising context of the first text;

comparing the first feature vector with the second feature vector;

based at least in part upon the comparison, determine that the first title indicates context of the first text;

generate a dataset of title-text pairs, wherein the generated dataset of title-text pairs comprises the first title paired with the first text; and train a target summarization algorithm with the generated dataset.

16. The non-transitory computer-readable medium of claim 15, wherein the instructions further cause the processor to:

receive a second text;

input the received second text to the target summarization algorithm; and predict a second title for the second text, wherein the second title indicates context of the second text.

17. The non-transitory computer-readable medium of claim 15, wherein determining that the first title indicates context of the first text comprises:

comparing each numerical value of the first feature vector with a counterpart numerical value of the second feature vector; and determining that more than a threshold number of numerical values of the first feature vector correspond to counterpart numerical values of the second feature vector.

18. The non-transitory computer-readable medium of claim 15, wherein determining that the first title indicates context of the first text comprises:

comparing each numerical value of the first feature vector with a counterpart numerical value of the second feature vector; and determining that more than a threshold number of numerical values of the first feature vector are within a threshold range of counterpart numerical values of the second feature vector.

19. The non-transitory computer-readable medium of claim 15, wherein the respective style of summarization comprises:

a first style in which a main topic is extracted from the first text and side topics of the first text are ignored; or a second style in which a sentiment of the first text extracted and included in a summary.

20. The non-transitory computer-readable medium of claim 15, wherein the instructions further cause the processor to:

for a second summary from the first set of summaries, execute the script to append the second summary to the set of summary-title pairs;

generate a second title associated with the second summary in response to executing the script;

compare the second title with the first text, wherein comparing the second title with the first text comprises:

generating a third feature vector for the second title, wherein:

the third feature vector indicates a position of the second title in a vector space; and the third feature vector represents a third set of features of the second title, comprising context of the second title; and comparing the first feature vector with the third feature vector;

based at least in part upon the comparison, determine that the second title does not indicate the context of the first text; and in response to determining that the second title does not indicate the context of the first text, remove the second title from consideration to be included in the dataset.

* * * * *